Patented Sept. 19, 1933

1,927,472

UNITED STATES PATENT OFFICE 1,927,472

PROCESS FOR THE MANUFACTURE OF SHELLAC SUBSTITUTES

Johannes Scheiber, Leipzig, Germany

No Drawing. Application March 8, 1930, Serial No. 434,461, and in Germany November 21, 1927

6 Claims. (Cl. 260—2)

This specification is a continuation in part of the application filed by me on November 15, 1928, under Ser. No. 319,717 now Patent 1,903,598.

This invention relates to shellac substitutes and to processes for making same.

The researches in the pure resin of natural shellac have shown that its essential compounds are formed by lactid-like combinations of aleuritinic-acid with shellol-acid or similar acids. Aleuritinic-acid is known to be a trihydroxy-palmitinic-acid, while shellol-acid is so far as known a hydroaromatic hydroxycarboxylic acid. By heating mixtures of these two acids, resin-like products are formed which correspond in their essential properties to the shellac resin itself.

A technical manufacture of shellac-like compounds as above outlined has not yet been effected. This has been attempted based upon the knowledge that the combination of similar suitable products—such as aliphatic hydroxy- and polyhydroxycarboxylic acids of all kinds instead of aleuritinic acid, and such as hydrogenized aromatic hydroxycarboxylic acids and oxidized resinolic-acids (for example hydroxy abietinic-acid) instead of shellol-acid—produces resins which show essential features of the pure resin of shellac.

In carrying out this method practically the great disadvantage is that the production of suitable aliphatic or hydro-aromatic hydroxy- and polyhydroxycarboxylic acids presents great difficulties. Although it is easy to transform with a good yield castor-oil-(or ricinoleic)-acid into trihydroxy-stearic-acid by treating castor-oil-acid with a solution of permanganate by applying this method upon the commercial linseed-oil-acids, there is produced a mixture of different unsaturated aliphatic acids, not only a very poor yield of the corresponding polyhydroxyacids, but moreover a mixture of inconstant and always changing quality.

Furthermore the production of hydroaromatic hydroxycarboxylic acids especially suited for the said purpose is difficult or uneconomic or not uniform in quality, as for example the production of hydroxyresinolic acids by permanganate-treatment of resinolic acids, for instance abietinic acid. Therefore, the choice of materials, from which to start, is very limited for both the groups of suitable hydroxyacids.

In my co-pending application, Ser. No. 319,717, filed November 15, 1928, it is stated that instead of using hydroxy- and polyhydroxycarboxylic acids the corresponding halogenized derivatives may be used, as may be obtained easily and in quantitative yield by treating suitable unsaturated acids of an aliphatic or hydroaromatic nature with chlorine. While the said application discloses such chlorinated products in combination with regularly obtained hydroxy- or polyhydroxycarboxylic acids, the present invention relates to combining only chlorinated or halogenized products. By this invention the choice of suitable components for the resinification processes is extraordinarily enlarged.

There is no difficulty in chlorinating as well unsaturated aliphatic acids, especially the acids of drying oils as linseed-oil acids, poppy-seed-oil acids, etc. or of non-drying oils, as castor-oil acids, olive-oil acids, etc., as also suitable unsaturated hydroaromatic acids, especially the so-called resinolic-acids, as abietinic-acid, manila-copal-acids etc. The chlorination may be effected by introducing chlorine into the liquefied or dissolved products, or by adding chlorine or a solution of hypo-chlorite of soda to an alkaline solution of the said acid-products, or in any other known and suitable way.

The chlorinated products may be precipitated from their watery alkaline solutions by adding a dilute acid as for example hydrochloric acid immediately or after some time, respectively after the solutions have been heated to accomplish the reaction, if necessary, under pressure. Instead of separately chlorinating the two components it is also possible to chlorinate mixtures of unsaturated aliphatic acids with unsaturated hydroaromatic acids and to precipitate the chlorinated products together.

These chlorinated substances, obtained in one way or another are to be combined with each other for the purpose of obtaining the desired resin-products. This reaction can be easily effected by heating the products, hydrochloric acid being split off. It is sometimes advisable to add suitable catalyzers as finely dispersed metals, anhydrous chlorides, alkali, oxides or hydroxides of the alkaline earth-metals, carbonates, etc.

In order to more fully describe the present invention, I will now proceed to give some specific examples thereof, it being understood that I do not thereby intend to limit the invention to the particular proportions, combinations or ingredients given.

*Example 1*

50 parts of the mixture usually referred to as of "linseed-oil-acid" and 100 parts of Manila-copal are transformed into the corresponding halogen derivates by introducing 40 parts of chlorine into their aqueous alkaline solution. The action of the chlorine being finished, dilute hydrochloric acid is added and the mixture of the chlorinated products is separated, washed and dried. The further treatment is effected by heating the mixture preferably in the presence of a small quantity of chloride of zinc. The temperature may be raised at the end of the reaction until approximately 180° C. The resin obtained shows especially well the peculiarities of natural shellac resin to be dissolved by weak alkalis, as borax, and to be aggregated by heat, if the temperature is kept for a short time at or above 200° C.

*Example 2*

120 parts of the mixture usually referred to as "castor-oil-acid" and 200 parts of Manila-copal are dissolved in water by adding 200 parts of carbonate of soda and heating preferably by introducing steam. After cooling 92 parts of chlorine are added. The chlorinated mixture is allowed to stand for some time and then heated in a vessel to about 150° C. After two hours the heating is stopped and the temperature diminished to 70–80° C. for producing a good precipitation when adding hydrochloric acid. The precipitated mixture is washed, dried and then heated to a temperature of about 150° C. The resin thus produced is of extremely light colour and easily soluble in alcohol, but insoluble in fatty oils, benzene and white spirit. It is, however, soluble in watery borax-solution. Furthermore it undergoes an extremely quick change into an insoluble and unmeltable product by short heating to temperatures at or above 200° C. All these properties show that the present resin resembles very closely the natural shellac resin itself.

Generally it is not difficult to obtain the resin-products, if prepared as described above, free of hydrochloric acid or of halogen, that splits off easily; in some cases however it may be advisable to grind the product with hot water, it being easily possible to obtain resins with a melting-point higher than 100° C. These products can be boiled out with water without liability to conglutinate. If it seems advisable, small quantities of an alkali metal carbonate or other alkali may be added to the water.

The new products obtained are resins of lactid-character. They resemble perfectly the shellac-resin itself and show especially the following qualities: They are soluble in aliphatic alcohols and insoluble or but slightly soluble in hydrocarbons and fatty oils; they are easily peptonized by weak alkalis, in particular by carbonates, ammonia and borax. They have a great ability of aggregation by heat. The quality of the resins can be changed in wide range for different purposes by suitable additions, as waxes, natural and artificial resins of all kind, esters of cellulose, plastifying agents, etc.

I do not desire to limit my invention exactly to the details given, but to include any and all modifications within the scope of the appended claims.

I claim:

1. A process for the manufacture of shellac substitutes which comprises subjecting a mixture of products obtained by the addition of halogen to unsaturated fatty acids from natural fatty oils and products obtained by the addition of halogen to resinolic acids to the action of heat till the halogen has been split off and a shellac-like resin has been formed.

2. A process for the manufacture of shellac substitutes which comprises subjecting a mixture of products obtained by the addition of chlorine to unsaturated fatty acids from natural fatty oils and products obtained by the addition of chlorine to resinolic acids to the action of heat till the chlorine has been split off and a shellac-like resin has been formed.

3. A process for the manufacture of shellac substitutes which comprises halogenizing a mixture of unsaturated fatty acids from natural fatty oils and of resinolic acids, separating the mixture of the resulting reaction products and subjecting these products to the action of heat till the halogen has been split off and a shellac-like resin has been formed.

4. A process for the manufacture of shellac substitutes which comprises chlorinating a mixture of unsaturated fatty acids from natural fatty oils and of resinolic acids, separating the mixture of the resulting reaction products and heating these products till the chlorine has been split off and a shellac-like resin has been formed.

5. A resin of lactid-character produced by subjecting to the action of heat a mixture of products obtained by the addition of halogen to unsaturated fatty acids from natural fatty oils and products obtained by the addition of halogen to resinolic acids till the halogen has been split off and a shellac-like resin has been formed.

6. A resin of lactid-character produced by subjecting to the action of heat a mixture of products obtained by the addition of chlorine to unsaturated fatty acids from natural fatty oils and products obtained by the addition of chlorine to resinolic acids till the chlorine has been split off and a shellac-like resin has been formed.

JOHANNES SCHEIBER.